United States Patent
Peng

(10) Patent No.: US 7,532,371 B2
(45) Date of Patent: May 12, 2009

(54) STRUCTURE OF A CARRIAGE MODULE

(75) Inventor: Wen-Bin Peng, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 1048 days.

(21) Appl. No.: 10/912,076

(22) Filed: Aug. 6, 2004

(65) Prior Publication Data

US 2006/0029429 A1 Feb. 9, 2006

(51) Int. Cl.
H04N 1/04 (2006.01)
(52) U.S. Cl. .................. 358/474; 358/488; 358/486; 358/494; 399/346; 399/110; 399/211
(58) Field of Classification Search .............. 358/474, 358/488, 487, 497, 494, 1.15, 486; 399/346, 399/110, 211
See application file for complete search history.

(56) References Cited

U.S. PATENT DOCUMENTS

| 6,164,755 | A  | * | 12/2000 | Yamamoto | 347/37 |
| 6,734,996 | B1 | * | 5/2004  | Lee | 358/486 |
| 6,819,896 | B2 | * | 11/2004 | Takahashi et al. | 399/211 |
| 6,836,633 | B2 | * | 12/2004 | Bannai et al. | 399/211 |
| 7,184,181 | B2 | * | 2/2007  | Cheng | 358/474 |
| 7,187,901 | B2 | * | 3/2007  | Ohashi | 399/388 |
| 7,202,980 | B2 | * | 4/2007  | Hayashi | 358/475 |

* cited by examiner

Primary Examiner—Negussie Worku
(74) Attorney, Agent, or Firm—Rosenberg, Klein & Lee

(57) ABSTRACT

An improved structure of carriage module has a datum board with a very flat surface, a linear light-source, a pair of side boards and a light-transforming module. The datum board has a flat-rigid connecting surface formed with a plurality of screw holes therein. The linear light-source is fixed at a front edge of the datum board for providing light. The side boards are respectively disposed on two sides of the connecting surface and assembled with a plurality of reflecting mirrors therebetween for reflecting light. The light-transforming module is assembled on a middle portion of the connecting surface for receiving an image and transforming the image into an electric signal. The datum board has an axle sleeve mounted on one side thereof for the carriage module to slide thereon.

14 Claims, 5 Drawing Sheets

STRUCTURE OF A CARRIAGE MODULE

BACKGROUND OF THE INVENTION

1. Field of the Invention

The present invention relates to an improved structure of a carriage module, and especially to a carriage module used inside a machine of an optical pickup device.

2. Description of the Related

In general, the carriage module is used by the optical pickup device as a scanner, a copy machine or a MFP (Multi-Function Printer) for scanning documents and transferring an optical image thereof into an electric signal. FIG. 1 shows a perspective view of the carriage module of the prior art. Referring to FIG. 1, the carriage module 9 is moved in a reciprocating, straight-line motion along an axle shaft 91 for picking up an image of the scanned document. The carriage module 9 of the prior art usually comprises a linear light-source 92, a carriage top cover 93, a plurality of reflecting mirrors (FIG. 1 just shows a first reflecting mirror 94), a carriage bottom seat 95, a condensing device 96 and a photoelectric transforming device 97.

The linear light-source 92 is usually a light tube for providing light. The light is reflected from the document to the reflecting mirrors. The condensing device 96, usually a lens set, receives the reflected light that is reflected from the reflecting mirrors and then condenses the reflected light to form an image on the photoelectric transforming device. The photoelectric transforming device is usually a CCD (charge-coupled device) for transforming a photo image into an electric signal. Final, the electric signal is transformed into a digital signal by an A/D converter and digital signal is communicated to a computer by a plurality of different interfaces.

With regard to the assembly of the carriage module, the parts of the carriage module are assembled on the carriage top cover 93 and the carriage bottom seat 95 with a concave receiving space, respectively. Moreover, the carriage top cover 93 and the carriage bottom seat 95 are assembled together. Referring to FIG. 1, the light-source 92 is assembled on the carriage top cover 93, and the condensing device 96 and the photoelectric transforming device 97 are screwed to an outside of the carriage bottom seat 95.

However, when the parts of the carriage module are assembled on the carriage top cover 93 or the carriage bottom seat 95, assembly tolerance occur during assembly of the carriage module. Then, the carriage top cover 93 and the carriage bottom seat 95 are assembled together, and the assembly tolerance occurs once again. The two assembly errors will affect the scanning quality. Furthermore, the carriage bottom seat 95 has a concave shape, which limits the assembly space of the carriage module.

With the employment of unique considerations and application of theories, and based on several years experience in specialized production of all flexible assembly systems and mechanisms, the inventor has come up with an innovative improved structure of the carriage module.

SUMMARY OF THE INVENTION

The primary object of the present invention is to provide an improved structure of a carriage module, which comprises a datum board with a flat-rigid connecting surface, so that all parts of the carriage module are assembled on the datum board for reducing the assembly tolerance and increasing the quality of scanning.

In order to achieve the above objects, the present invention provides an improved structure of a carriage module, comprising a datum board, a linear light-source, a pair of side boards and a light-transforming module.

The datum board has a flat-rigid connecting surface and a plurality of screw holes formed in the flat-rigid connecting surface. The linear light-source is fixed on a front edge of the datum board. The pair of side boards is respectively disposed at two sides of the datum board, and each of the side boards has a plurality of reflecting mirrors fixed thereon. The light-transforming module is assembled on a middle portion of the connecting surface.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawing, in which.

DETAILED DESCRIPTION OF PREFERRED EMBODIMENTS

Figure 1:
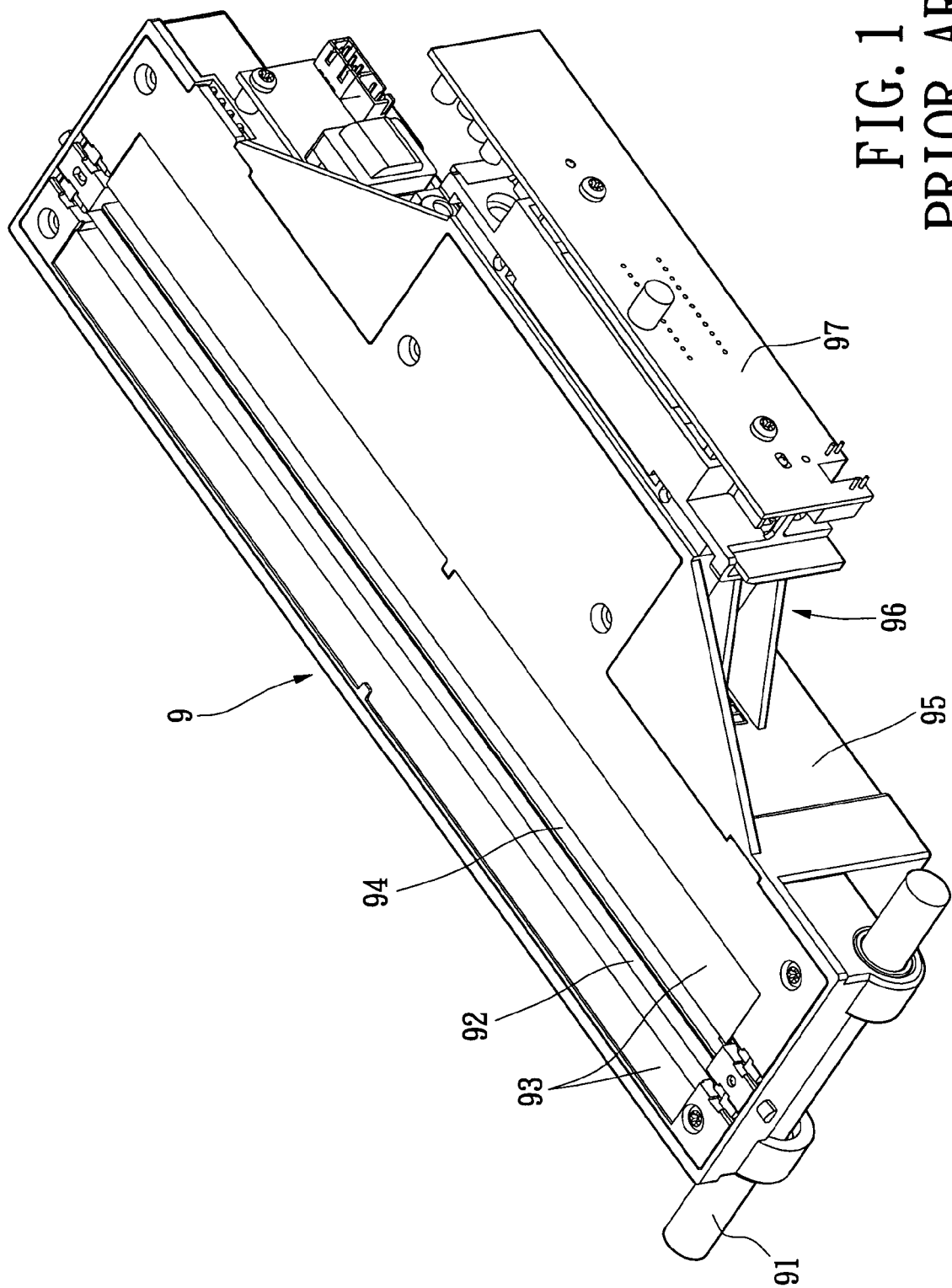
FIG. 1 is a perspective view of the carriage module of the prior art.
Figure 2:
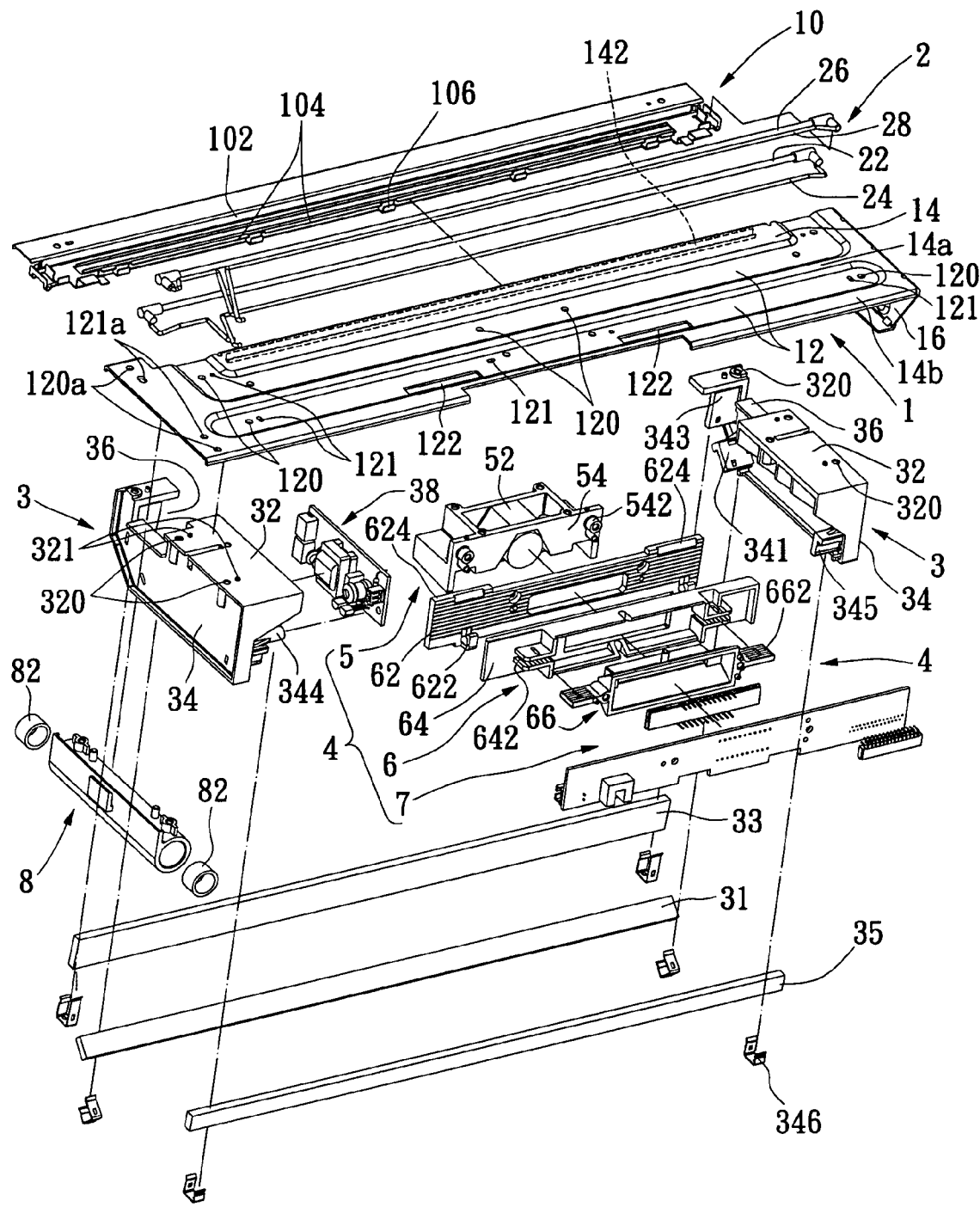
FIG. 2 is an exploded view of the improved structure of the carriage module according to the present invention.

FIG. 2 shows an exploded view of the improved structure of the carriage module according to the present invention. Referring to FIG. 2, the present invention provides an improved structure of a carriage module comprising a datum board 1, a linear light-source 2, a pair of side boards 3, a light-transforming module 4 and an axle sleeve 8.

The datum board 1 has a flat-rigid connecting surface 12. The linear light-source 2 is fixed at a front edge of the datum board 1 to provide light for scanning a document. The pair of side boards 3 are respectively disposed at two sides of the connecting surface 12, and has a plurality of reflecting mirror 31, 33 and 35 fixed between the pair of side boards 3 for repeatedly reflecting an image of the document to a predetermined distance of an optical path. The light-transforming module 4 is assembled on a middle portion of the connecting surface 12 for receiving the image of the document and transferring the image of the document into an electric signal. The axle sleeve 8 is connected to one side of the datum board 1. The axle sleeve 8 has an axle shaft 84 received therein, and two rings 82 disposed at two sides thereof and surrounding two sides of the axle sleeve 84 for the carriage module to slide on the two rings 82.

The linear light-source 2 includes a first light-source 22 with a wire rod 24 and a second light-source 26 with a wire rod 28 for providing a clearer image.

The datum board 1 further comprises a sliding plate 16 bent from another side thereof and opposite the axle sleeve 8 for the carriage module to slide on the sliding plate 16.

The connecting surface 12 of the datum board 1 has a plurality of screw holes 120 and positioning holes 121 formed in the middle portion and on two sides thereof for screwing and fixing parts thereto.

The datum board 1 has at least one rib projecting from the connecting surface 12 for strengthening the structural integrity thereof. The present invention provides three ribs 14, 14a and 14b respectively projecting from a front side, a middle and a rear side of the connecting surface 12 for strengthening the structure intensity of the datum board 1, and especially to withstand torque from bending.

The present invention further comprises an auxiliary top cover 10 disposed in front of the datum board 1 and fixed on the pair of side boards 3 for fixing the light-source 2. The auxiliary top cover 10 has a slot 102 for receiving and fixing the second light-source 26, and two bending piece 104, 106 arranged at a rear side thereof for fixing the wire rod 24 of the first light-source 22 and the wire rod 28 of the second light-source 26, respectively. The rib 14 has a plurality of bending portions 142 disposed at a front side thereof for fixing the auxiliary top cover 10.

Each of the side boards 3 includes a horizontal portion 32 and a vertical portion 34 connecting to the horizontal portion 32. The horizontal portion 32 has a plurality of screw holes 320 and positioning posts 321 corresponding to the screw holes 120 and positioning holes 121 of the connecting surface 12. The vertical portion 34 has a plurality of lens seats 314, 343 and 345 projecting therefrom for clamping and fixing the corresponding reflecting mirrors 31, 33 and 35 by a clamping piece 346. One of the two side boards 3 has a light-source PCB 38 screwed onto a screw post 344 of the vertical portion 34.

The light-transforming module 4 includes a lens set 5, a photomask set 6 and a photoelectric-transforming device 7 fixed at a rear surface of the photomask set 6.

The lens set 5 has a plurality of lenses (no label) fixed in the middle thereof, and a top face 52 and a rear face 54 formed thereon. The top face 52 has a plurality of screw holes and positioning posts (no label) corresponding to screw holes 120 and positioning holes 121 for fixing the lens set 5 on the connecting surface 12 of the datum board 1. The rear face 54 of the lens set 5 has a plurality of screw posts 542 and positioning post (no label).

The photomask set 6 has a screw hole and positioning hole (no label) for fixing the photomask set 6 on the screw post 542 of the rear face 54. The photomask 6 is composed of a front photomask 62, a middle photomask 64 and a rear photomask 66. The front photomask 62 has a hook 622 for clamping the middle photomask 64. The middle photomask 64 has two clamping grooves 642 for clamping two wing plates 662 of the rear photomask 66. The front photomask 62 has two retaining portions 624 projecting upwardly therefrom and the connecting surface 12 of the datum board 1 has two retaining holes 122 opposite the two retaining portions 624.

The photoelectric-transforming device 7 is received in the rear photomask 66 and fixed on a rear face of the rear photomask 66 by a PCB (no label).

Figure 3:
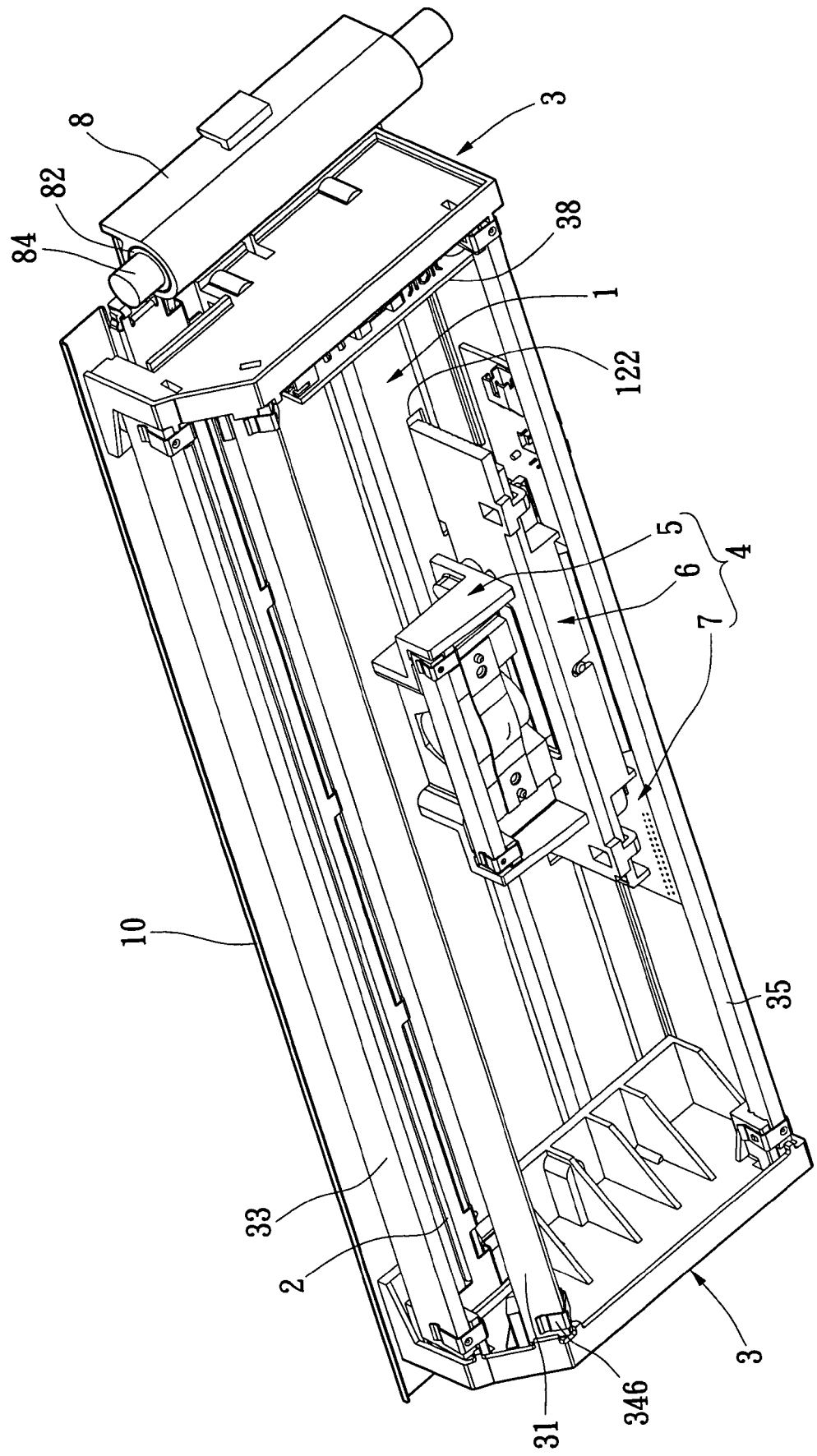
FIG. 3 is a perspective view of the improved structure of the carriage module according to the present invention.
Figure 4:
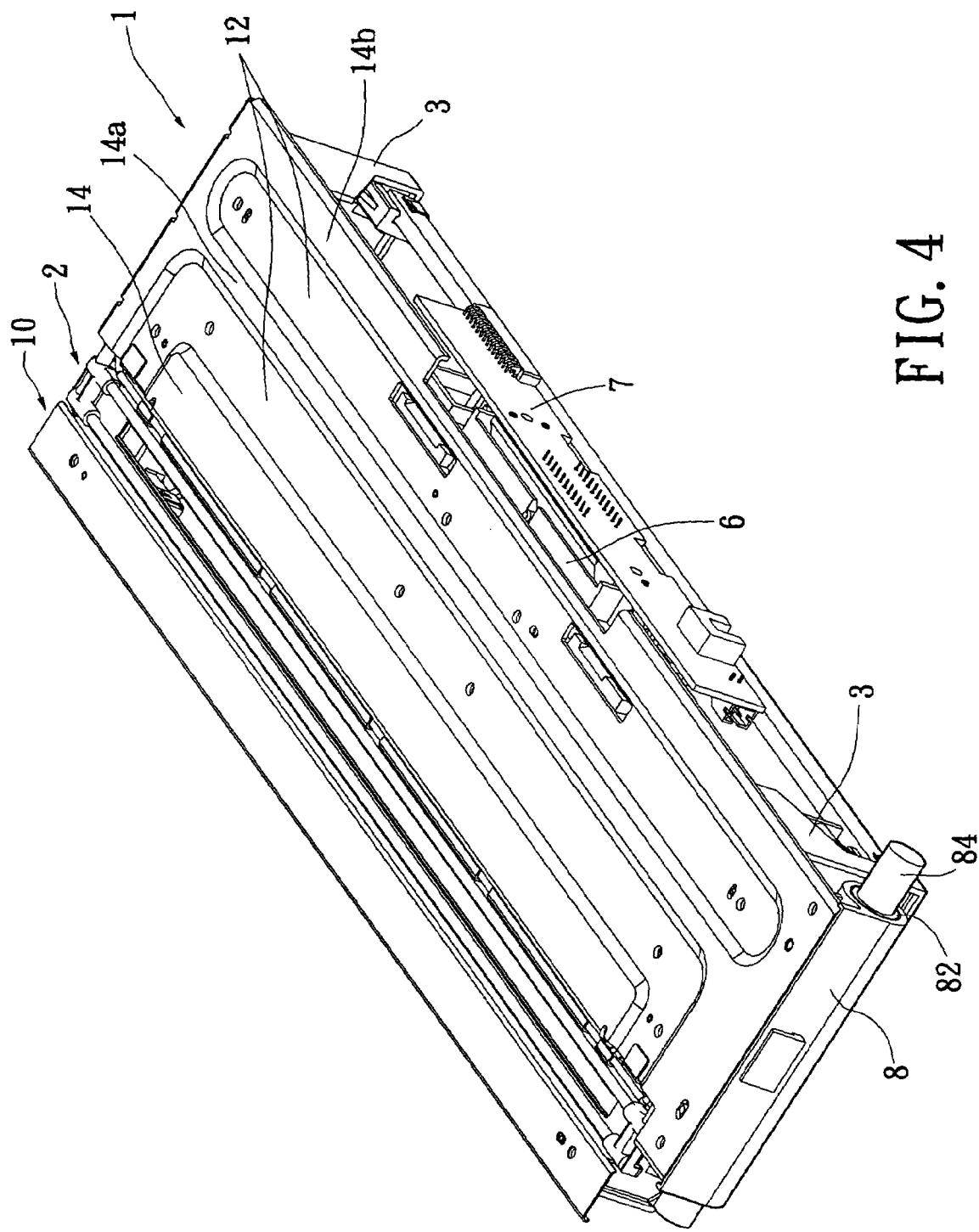
FIG. 4 is another perspective view of the improved structure of the carriage module according to the present invention.

FIG. 3 shows a perspective view of the improved structure of the carriage module according to the present invention. FIG. 4 shows another perspective view of the improved structure of the carriage module according to the present invention. Referring to FIGS. 3 and 4, the datum board 1 and the auxiliary top cover 10 are made of rigid material or made of metal material by pressing. Pressing is considered a "cold working" process, which is used to increase production capability per unit time and obtain optimal flatness. Consumption of metal material is less in the pressing process than in metal casting or injection molding, which uses plastic.

Figure 3A:
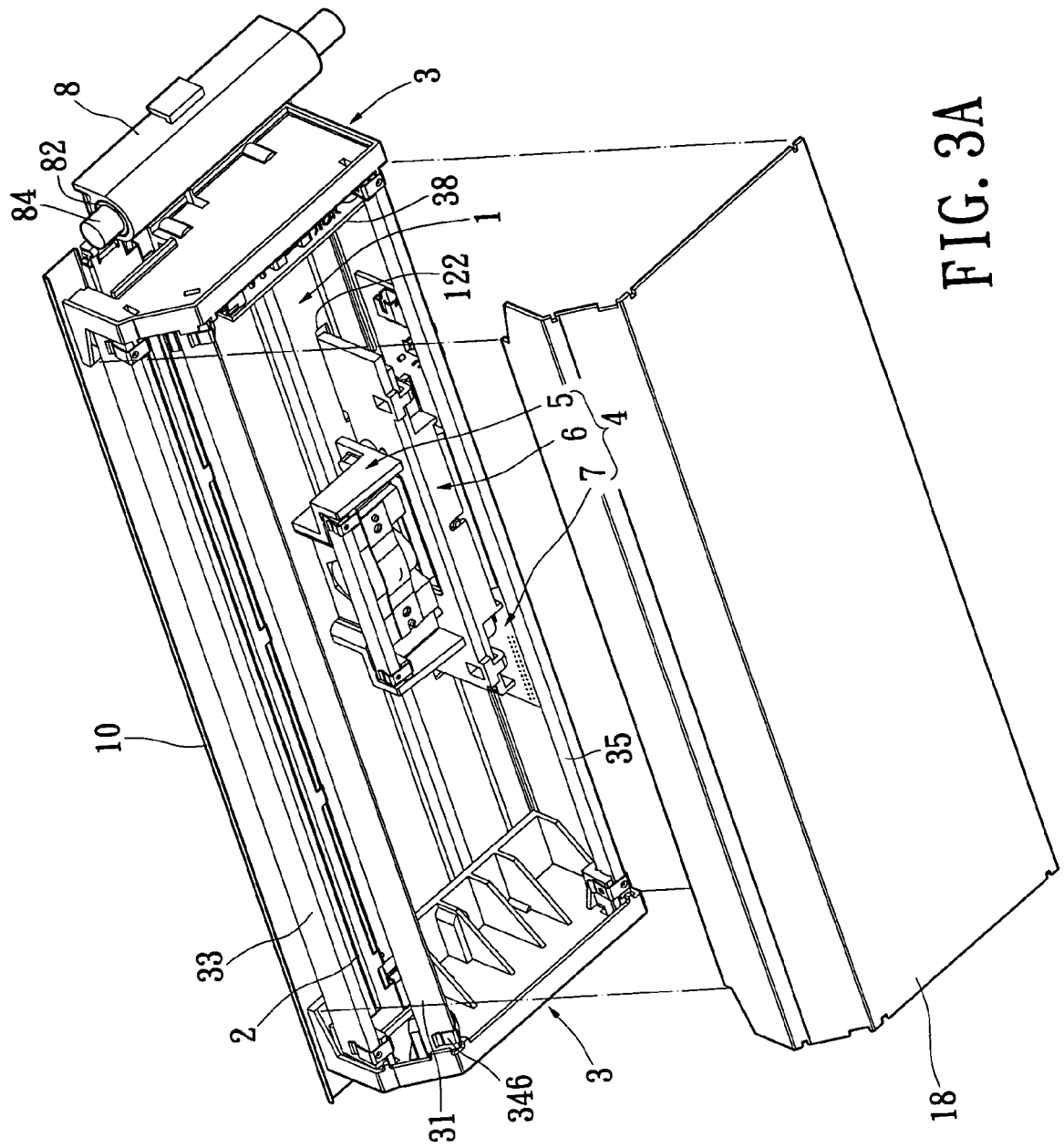
FIG. 3A is an exploded view of the improved structure of the carriage module according to another embodiment of the present invention.

FIG. 3A shows an exploded view of the improved structure of the carriage module according to another embodiment of the present invention. Referring to the FIG. 3A, the carriage module further comprises a anti-glare casing 18 having a shape corresponding to that of the side board 3 and disposed outside of the side board 3.

The carriage module of the present invention omits the assembly of the carriage bottom seat and carriage top cover, and the assembly tolerance is consequently very small. Moreover, all parts of the present invention are assembled together according to a datum plan with a high degree of flatness for reducing the assembly error.

The present invention has an open assembly space, making the user to assemble the parts conveniently, and increasing the assembly speed and production rate.

To sum up, the carriage module of the present invention includes some advantages, comprising:
 (1) The assembly of parts has optimal flatness, and the assembly tolerance is very small for high quality scanning;
 (2) Production time for per unit is decreased, and production efficiency is increased;
 (3) The consumption of material and thus production cost are reduced; and
 (4) It is convenient for user to assemble the parts, and the assembly speed and production rate are increased.

Although the present invention has been described in some detail by way of illustration and example for purposes of clarity and understanding, it will of course be understood that various changes and modifications may be made in the form, details and arrangements of the parts without departing from the scope of the invention as set forth in the following claims.

What is claimed is:

1. An improved structure of a carriage module, comprising:
   a datum board having a flat-rigid connecting surface and a plurality of screw holes formed in the flat-rigid connecting surface;
   a linear light-source fixed on a front edge of the datum board;
   a pair of side boards respectively disposed at two sides of the datum board and collapsibly secured thereto at respective screw holes of said plurality of screw holes thereof,
   a plurality of reflecting mirrors secured by opposite ends thereof to said pair of side boards;
   a light-transforming module positioned at a middle portion of the connecting surface and collapsibly secured thereto at predetermined ones of said plurality of screw holes; and
   a strengthening unit formed on said datum board.

2. The improved structure of the carriage module as claimed in claim 1, further comprising an axle sleeve collapsibly secured to a side of the datum board, two rings disposed at two sides of said axle sleeve, and an axle shaft reciprocating in said axle sleeve inside of said two rings.

3. The improved structure of the carriage module as claimed in claim 1, wherein said strengthening unit formed on the datum board includes at least one rib projecting upwardly from the connecting surface for strengthening structural integrity thereof.

4. The improved structure of the carriage module as claimed in claim 3, wherein the front edge of the datum board has a plurality of bending portions for fixing wire rods of the light-source.

5. The improved structure of the carriage module as claimed in claim 4, wherein the bending portions of the datum board are disposed on front of the at least one rib.

6. The improved structure of the carriage module as claimed in claim 1, wherein the datum board has a sliding plate extending vertically from one side thereof.

7. The improved structure of the carriage module as claimed in claim 1, wherein the datum board is made of a metal material by pressing.

8. The improved structure of the carriage module as claimed in claim 1, further comprising an auxiliary top cover disposed in front of the datum board and fixed on the pair of side boards.

9. The improved structure of the carriage module as claimed in claim 8, wherein the auxiliary top cover has a second light-source fixed thereon.

10. The improved structure of the carnage module as claimed in claim 1, wherein each of the side boards comprises a horizontal portion screwed to the datum board and a vertical portion having a plurality of lens seats projecting therefrom, said pluratity of refelecting mirrors being secured to said lens seats by a clamping plate.

11. The improved structure of the carriage module as claimed in claim 10, wherein one of the side boards has a light-source PCB received in the vertical portion thereof for controlling the light-source.

12. The improved structure of the carriage module as claimed in claim 1, wherein the light-transforming module comprises a lens set screwed to the middle portion of the connecting surface of the datum board, a photomask set fixed on a rear face of the lens set, and a photoelectric transforming device fixed on a rear face of the photomask set.

13. The improved structure of the carriage module as claimed in claim 12, wherein the photomask set has two retaining portions projecting upwardly therefrom, and wherein the connecting surface of the datum board has two retaining holes corresponding to the two retaining portions.

14. The improved structure of the caniage module as claimed in claim 1, further comprising an anti-glare casing disposed outside of the pair of side boards.

* * * * *